Dec. 9, 1941.     A. BRUEHL     2,265,893
NAVIGATING PROTRACTOR
Filed Jan. 23, 1940
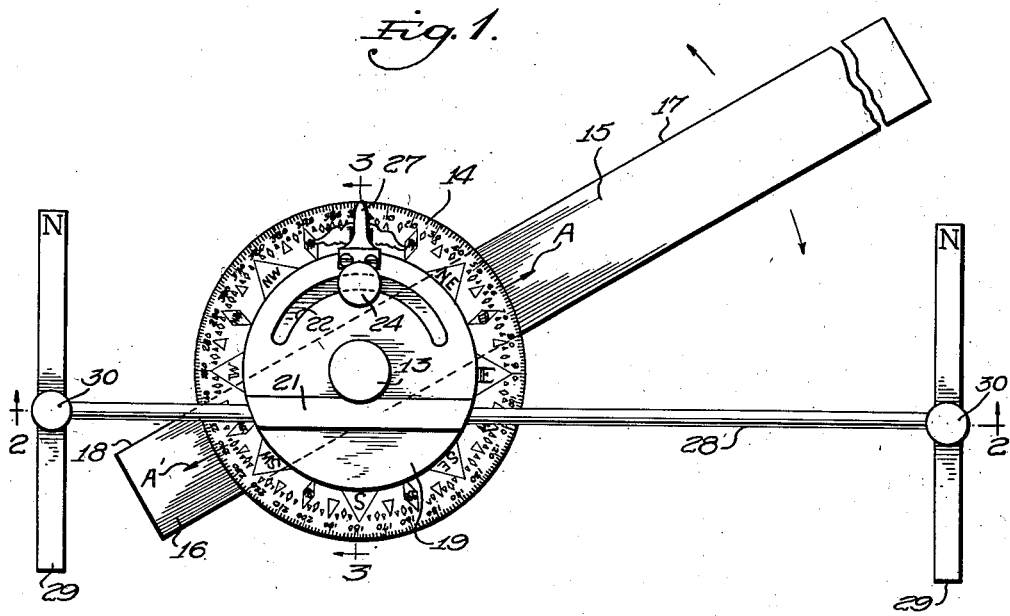
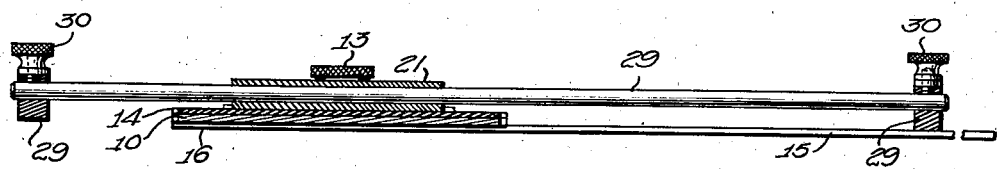
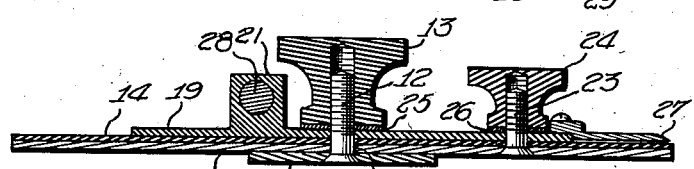
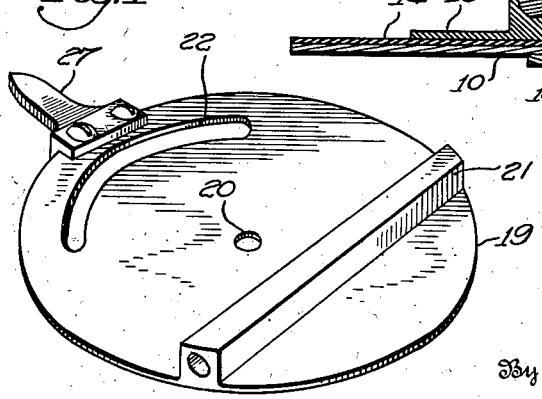
Inventor
ANTON BRUEHL
By C. R. Parker
Attorney Patented Dec. 9, 1941

2,265,893

UNITED STATES PATENT OFFICE 2,265,893

NAVIGATING PROTRACTOR

Anton Bruehl, New York, N. Y.

Application January 23, 1940, Serial No. 315,243

8 Claims. (Cl. 33—101)

This invention relates to navigating protractors or course finders.

An important object of the invention is to provide a simple and easily operable protractor device to assist in laying a course between two known points on a chart.

A further object is to provide such a device wherein simple means is provided for correcting the device as to variation and deviation.

A further object is to provide a device which may be very readily placed in position on a chart, and wherein the course may be directly read from the protractor, without reversing the reading, regardless of the direction of travel of the ship.

Other objects and advantages of the invention will become apparent during the course of the following description.

In the drawing I have shown one embodiment of the invention. In this showing:

Figure 1 is a plan view of the device, a portion of the straight edge being broken away, Figure 2 is a vertical sectional view on line 2—2 of Figure 1, Figure 3 is a transverse vertical sectional view on line 3—3 of Figure 1, and, Figure 4 is a detail perspective view of the adjustable plate of the device.

Referring to the drawing the numeral 10 designates the base plate of the device which is preferably formed circular in shape of substantially rigid material. This plate is provided with an axial opening 11 (Figure 3) to receive a pivot stem 12 having a thumb nut 13 threaded on its upper end. The plate 10 is preferably formed of metal and has cemented or otherwise secured to its upper face a disk 14 which may be formed of Celluloid or any other suitable material and etched, stamped or otherwise formed to provide a standard compass rose. Such construction is preferred, although it will be apparent that the disk 14 may be eliminated and the upper face of the disk 10 provided with the compass rose.

An arm 15 carries the stem 12 and projects radially a substantial distance beyond the compass rose 14. This arm projects beyond the diametrically opposite side of the compass rose as at 16 and the opposite ends of the arm 15 are provided with aligned edges 17 and 18 respectively forming a straight edge adapted to be aligned between any two points on a chart. The lower end of the stem 12 is preferably riveted over as shown in Figure 3 and has its lower end flush with the lower face of the arm 15.

Above the compass rose is arranged an adjustable disk 19, preferably formed of metal, and provided with an axial opening 20 rotatably receiving the stem 12. To one side of its center, the disk 19 is provided with a bearing 21 for a purpose to be described. The disk 19 is also provided with an arcuate slot 22 having its center coincident with the center of the stem 21 and receiving an adjusting screw 23 (Figure 3) the lower end of which is fixed with respect to the plate 10 and the upper end of which is threaded to receive a thumb nut 24. Friction washers 25 and 26 may be arranged beneath the respective thumb nuts 13 and 24.

The disk 19 is substantially smaller than the compass rose, as shown in Figure 1, so that the compass rose is always uncovered and plainly visible. A pointer 27 is carried by the disk 19 and operates over the compass rose to determine the adjustment of the disk 19 with respect to the compass rose to correct the device for variation and deviation, as will become apparent.

A rod 28 is slidably mounted in the bearing 21 and is provided at its ends with straight edged cross members 29 arranged exactly perpendicular thereto and secured in position by thumb nuts 30. One end of each cross member 29 is preferably marked with the letter "N", as shown in Figure 1, to indicate the direction "north."

The operation of the device is as follows:

As previously stated, the pointer 27 is provided to correct the position of the disk 19 with respect to the compass rose in accordance with variation and deviation. In correcting for variation, the device is placed near the compass rose on the chart and the pointer or arrow 27 is set with respect to zero or north on the compass rose 14 exactly as the arrow and zero are marked on the compass rose on the chart. Suitable correction is then made for the known deviation, whereupon the thumb nut 24 is tightened to fix the disk 19 with respect to the compass rose. Additional assurance against movement of the parts is provided by tightening the thumb nut 13. The device is now ready for use.

In plotting a course on a chart, the straight edge 17 is placed on the chart to intersect two known points between which it is desired to plot a course. The arm 15 is then held stationary while the rod 28, disks 10 and 19 and compass rose 14 are rotated with respect to the arm 15 to permit the cross members 29 to assume direct north and south positions. The operator will slide the rod 28 in the bearing 21 to bring one edge of one of the cross members 29 into registration with a meridian line on the chart, whereupon a reading may be taken from the position of one of the arrows A—A' on the arm 15 and its extension 16. Such reading will give the course to the navigator, corrected for variation and deviation. The edges 17 and 18 are in alignment with each other, which is also true of the arrows A and A', and accordingly the reading may be taken directly from the compass rose at either side thereof, depending upon the direction in which the ship is travelling.

It will be noted that the device may be placed anywhere on the chart, facing any direction with the chart facing in any direction, which is not true of many navigating projectors. It also will be noted that the compass rose is identical with the compass rose on the chart and not reversed with respect thereto, as is true of many devices of this character and from which confusion often arises. The device is so simple and readily usable that it does not require any printed directions to enable it to be used by amateur or unskilled navigators.

It will be apparent, of course, that the protractor, in addition to laying a course, is equally adaptable to any other uses in which a protractor of this type may be employed. For example, it may be used in setting an observation taken from a lighthouse or other landmark onto the chart. In this case, the bearing in degrees of an aid to navigation taken by radio beam or pelorus is set on the protractor and the center thumb screw 13 tightened. The protractor is then placed on the chart with one end of the straight edge passing through the aid to navigation, whereupon the protractor is bodily swung until one of the cross members 29 is parallel to a meridian on the chart. The pencil line drawn along the straight edge will then pass through the position of the ship, as will be apparent.

After laying a course on the chart, the straight edge may be left on the course so that any movement of the protractor on the chart can be noticed at any time during the plotting of the course. The device permits quick and easy correction for variation and deviation and the disk 19 will remain set with respect to the compass rose upon the tightening of the thumb nut 13. The course can be read instantly for either direction of travel without turning the protractor due to the alignment of the arrows A and A' on the oppositely projecting portions of the straight edge. It also will be apparent that the device does not require the use of the members 29 perpendicular to the rod 28, this arrangement being used to permit the aligning of one of the members 29 with a meridian of longitude. If desired, the rod 28 or some element carried thereby and parallel thereto may be employed instead of the members 29, and aligned with degrees of latitude.

It is to be understood that the form of the invention herewith shown and described is to taken as a preferred example of the same and that various changes in the shape, size and arrangement of parts may be resorted to without departing from the spirit of the invention or the scope of the subjoined claims.

I claim:

1. A navigating protractor comprising an arm having a straight edge, a protractor-bearing member axially pivoted to said arm, a second member mounted to turn coaxially with respect to said first member, a rod connected to said second member and having means thereon adapted to be aligned with a chart line, and means for fixing said second member in adjusted positions with respect to said protractor-bearing member to correct for deviation and variation, said second member having a pointer operable over the protractor of said first named member as a deviation and variation correction indicator.

2. A navigating protractor comprising an arm having a straight edge, a protractor-bearing member axially pivoted to said arm, a second member mounted to turn coaxially with respect to said first member, a rod, means carried by said second member and supporting said rod for axial sliding movement, means on one end of said rod adapted to be aligned with a chart line, and means for securing said second member in adjusted positions with respect to said protractor-bearing member to correct for deviation and variation, said second member having a pointer operable over the protractor of said first named member as a deviation and variation correction indicator.

3. A navigating protractor comprising a flat arm having a straight edge, a protractor-bearing disk arranged over said arm adjacent one end thereof and pivoted coaxially thereto, the upper surface of said disk being calibrated adjacent the periphery of the disk, a second disk arranged over said first named disk and mounted to turn coaxially with respect thereto, a rod carried by said second disk and having means at one end thereof adapted to be aligned with a chart line, and means for securing said disks in adjusted positions with respect to each other to correct for deviation and variation.

4. A navigating protractor comprising a flat arm having a straight edge, a protractor-bearing disk arranged over said arm adjacent one end thereof and pivoted coaxially thereto, the upper surface of said disk being calibrated adjacent the periphery of the disk, a second disk arranged over said first named disk and mounted to turn coaxially with respect thereto, a rod carried by said second disk and having means at one end thereof adapted to be aligned with a chart line, and means for securing said disks in adjusted positions with respect to each other to correct for deviation and variation, said second disk being of smaller diameter than said first disk and having a pointer operating over the calibrated portion of the latter.

5. A navigating protractor comprising a flat arm having a straight edge, a protractor-bearing disk arranged over said arm adjacent one end thereof and pivoted coaxially thereto, the upper surface of said disk being calibrated adjacent the periphery of the disk, a second disk lying over said first disk and mounted to turn coaxially with respect thereto, said second disk being of smaller diameter than said first disk and having a pointer extending over the calibrated portion thereof, means for securing said disks together with said pointer in adjusted positions to correct for deviation and variation, guide means carried by said second disk, a rod axially slidable in said guide means, and means carried by said rod and adapted to be aligned with a chart line.

6. A navigating protractor comprising a flat arm having a straight edge, a protractor-bearing disk arranged over said arm adjacent one end thereof and pivoted coaxially thereto, the upper surface of said disk being calibrated adjacent the periphery of the disk, a second disk lying over said first disk and mounted to turn coaxially with respect thereto, said second disk being of smaller diameter than said first disk and having a pointer extending over the calibrated portion thereof, means for securing said disk together with said pointer in adjusted positions to correct for deviation and variation, guide means carried by said second disk, a rod axially slidable in said guide means, a cross member carried by said rod adjacent one end thereof and perpendicular thereto, said cross member having an edge adapted to coincide with a meridian line on a chart.

7. A navigating protractor comprising an elongated flat arm forming a straight edge, a pivot stem carried by said arm and projecting upwardly therefrom, a protractor disk mounted to turn axially on said stem, a second disk mounted above said first disk to turn axially on said stem, a pointer carried by said second disk and operating over the protractor on said first disk, means for clamping said disks against relative turning movement in adjusted positions with respect to each other, said stem being spaced from both ends of said straight edge a distance greater than the diameter of said first disk, whereby said straight edge projects beyond opposite edges of said first disk, said straight edge having markings thereon aligned at diametrically opposite points with respect to said disk, a slide bearing mounted on the upper face of said second disk, a rod axially slidable in said bearing, and means carried by said rod having a straight edge adapted to coincide with a chart line.

8. A navigating protractor comprising an elongated flat arm forming a straight edge, a pivot stem carried by said arm and projecting upwardly therefrom, a protractor disk mounted to turn axially on said stem, a second disk mounted above said first disk to turn axially on said stem, a pointer carried by said second disk and operating over the protractor on said first disk, means for clamping said disks against relative turning movement in adjusted positions with respect to each other, said stem being spaced from both ends of said straight edge a distance greater than the diameter of said first disk whereby said straight edge projects beyond opposite edges of said first disk, said straight edge having markings thereon aligned at diametrically opposite points with respect to said disk, a slide bearing mounted on the upper face of said second disk, a rod axially slidable in said bearing, and a cross member carried by one end of said rod and having a straight edge perpendicular to said rod adapted to coincide with a meridian line on a chart.

ANTON BRUEHL.